(12) United States Patent
Young

(10) Patent No.: US 9,121,427 B2
(45) Date of Patent: Sep. 1, 2015

(54) STAPLE ASSEMBLY

(71) Applicant: ILLINOIS TOOL WORKS INC., Glenview, IL (US)

(72) Inventor: Graeme Young, Hamilton (NZ)

(73) Assignee: Illinois Tool Works Inc., Glenview, IL (US)

(*) Notice: Subject to any disclaimer, the term of this patent is extended or adjusted under 35 U.S.C. 154(b) by 7 days.

(21) Appl. No.: 14/014,724

(22) Filed: Aug. 30, 2013

(65) Prior Publication Data
US 2015/0063949 A1    Mar. 5, 2015

(51) Int. Cl.
*F16B 15/08* (2006.01)
*F16B 15/00* (2006.01)

(52) U.S. Cl.
CPC ............ *F16B 15/0015* (2013.01); *F16B 15/08* (2013.01)

(58) Field of Classification Search
USPC ......... 411/442, 443, 444, 457, 458, 468, 487, 411/490, 920, 921
See application file for complete search history.

(56) References Cited

U.S. PATENT DOCUMENTS

| D30,896 S | * | 5/1899 | LaPrelle | D8/390 |
|---|---|---|---|---|
| 1,510,360 A | * | 9/1924 | Rijmenam | 281/50 |
| 2,122,814 A | * | 7/1938 | Hansen | 206/340 |
| 2,867,807 A | * | 1/1959 | Anstett | 206/340 |
| 3,128,667 A | * | 4/1964 | Tremblay | 411/443 |
| 3,170,279 A | * | 2/1965 | Dubini | 59/77 |
| 3,618,447 A | * | 11/1971 | Goins | 411/456 |
| 3,813,985 A | * | 6/1974 | Perkins | 411/442 |
| 3,969,975 A | * | 7/1976 | Krol | 411/456 |
| 4,343,579 A | * | 8/1982 | Shelton et al. | 411/442 |
| 5,441,373 A | * | 8/1995 | Kish et al. | 411/442 |
| 6,071,053 A | * | 6/2000 | Kuhns | 411/442 |
| 6,915,937 B2 | | 7/2005 | Lat et al. | |
| 6,957,756 B2 | | 10/2005 | Lat et al. | |
| 2005/0145666 A1 | | 7/2005 | Lat et al. | |
| 2009/0191023 A1 | * | 7/2009 | Chang | 411/443 |

* cited by examiner

*Primary Examiner* — Roberta Delisle
(74) *Attorney, Agent, or Firm* — Greer, Burns & Crain Ltd.; Maurice E. Finnegan, III, Esq.

(57) ABSTRACT

Disclosed is an assembly of staples, the staples having a crown portion having at least two legs extending therefrom and one or more barbs protruding from at least one of the legs, the assembly further including at least one strip of collation tape, wherein the staples are collated and connected by way of the at least one strip of collation tape secured to the staples. In one form a portion of the collation tape remain affixed to the staples when driven by driver blade in a powered staple tool and assists in maintaining alignment of the staple in a nosepiece of the tool.

6 Claims, 3 Drawing Sheets

STAPLE ASSEMBLY

TECHNICAL FIELD

This disclosure relates staples assemblies for use in powered tools and in particular, staples of the type that comprise barbs that may provide increased retention in a workpiece. The disclosure also relates to methods of driving staples into a workpiece.

BACKGROUND

Traditionally, staples have been used to attach items to workpieces (e.g. rural posts, wire livestock fences, power poles etc.). Often, such staples are hand driven into the workpiece using a manual tool.

Power tools for driving staples into a workpiece are also known in the art. These generally comprise a driver blade for driving the staple into the workpiece and a nosepiece comprising a passage to guide the staple as it is driven into the workpiece. These power tools can also comprise a magazine which is able to hold an arrangement of collated staples that may be fed into the firing chamber of the nosepiece.

Barbed staples, which comprise barbs extending from the legs of the staples, are also known in the art. The barbs on the staples can allow stronger retainment (i.e. when compared to traditional non-barbed staples) of the staple in a workpiece.

The barbs on such staples meant that they are not suitable for power tools known in the art that are configured for use with non-barbed staples. As such, only manual (i.e. hand driven) tools are presently used for such staples.

The above references to the background art do not constitute an admission that the art forms part of the common general knowledge of a person of ordinary skill in the art. The above references are also not intended to limit the application of the staple assemblies as disclosed herein.

SUMMARY

Disclosed is an assembly of staples, the staples comprising a crown portion having at least two legs extending therefrom and one or more barbs protruding from at least one of the legs, the assembly further comprising at least one strip of collation tape, wherein the staples are collated and connected by way of the at least one strip of collation tape secured to the staples.

Also disclosed is a barbed staple comprising: a crown; two legs extending from the crown; and one or more barbs protruding from the legs; wherein the staple further comprises at least one guiding element secured to at least one of the legs at a location between the respective barb of the leg and the crown.

Also disclosed is a method of driving a barbed staple into a workpiece, the method comprising: locating a barbed staple in a nosepiece of a powered tool, the barbed staple being in the form as disclosed above; and driving the staple along a longitudinal axis of the nosepiece and into the workpiece under operation of a driver blade of the powered tool; wherein the guiding element inhibits lateral movement of the staple with respect to the longitudinal axis when it is being driven.

BRIEF DESCRIPTION OF THE DRAWINGS

Embodiments will now be described by way of example only, with reference to the accompanying drawings in which.

DETAILED DESCRIPTION

Figure 1A:
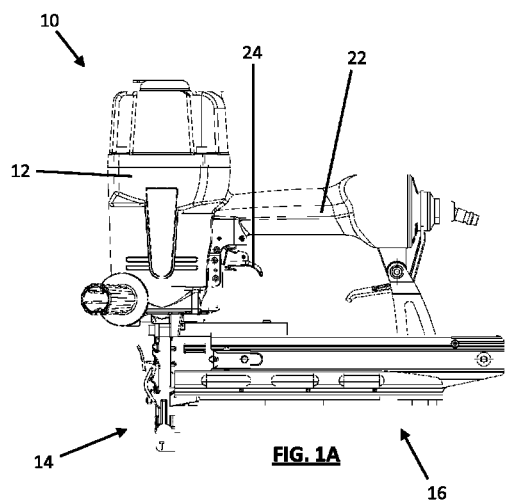
FIGS. 1a and 1b are side views of an embodiment of a powered staple tool.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Disclosed is an assembly of staples, the staples comprising a crown portion having at least two legs extending therefrom and one or more barbs protruding from at least one of the legs, the assembly further comprising at least one strip of collation tape, wherein the staples are collated and connected by way of the at least one strip of collation tape secured to the staples.

In some forms, the at least one strip of collation tape is secured to legs of the staples at a location between the respective crowns and the one or more barbs of the staples.

In some forms, each of the legs of the plurality of staples includes one or more barbs which project outwardly from the legs.

In some forms, the barbs may have a flat, square or round tip.

Also disclosed is a barbed staple comprising: a crown; two legs extending from the crown; and one or more barbs protruding from the legs; wherein the staple further comprises at least one guiding element secured to at least one of the legs at a location between the respective barb of the leg and the crown.

In some forms, the at least one guiding element is a portion of collation tape.

Also disclosed is a method of driving a barbed staple into a workpiece, the method comprising: locating a barbed staple in a nosepiece of a powered tool, the barbed staple being in the form having a crown; two legs extending from the crown; and one or more barbs protruding from the legs; wherein the staple further comprises at least one guiding element secured to at least one of the legs at a location between the respective barb of the leg and the crown; and driving the staple along a longitudinal axis of the nosepiece and into the workpiece under operation of a driver blade of the powered tool; wherein the guiding element inhibits lateral movement of the staple with respect to the longitudinal axis when it is being driven.

When compared to manual methods, the use of a power tool for driving a staple into a workpiece (e.g. a post, bench, wall etc.) can be both quicker and easier. This can be especially true with regards to barbed staples, which can offer more resistance against insertion into a workpiece. Moreover, a power tool may provide greater precision and control over the placement and depth of a staple in a workpiece. For example, a power tool may provide the precision required when driving a staple across a fence wire in order to avoid damage to the fence wire. Additionally, use of a power tool instead of a manual method reduces the manual labour required by a user, which may in turn reduce repetitive strain injuries and operator fatigue.

To accommodate for the barbs in the staple legs, adequate clearances need to be provided in the nosepiece of the tool for both loading and passage of the staple through the nosepiece. These clearances increase the likelihood that the staple may twist or move laterally in the nosepiece which may result in jamming of the staple in the nosepiece. To compensate for this, the tool may include arrangements to maintain the staple alignment. These may include maintaining close support of the staple in the proximal portion of the nosepiece, and using guiding elements on the legs of the staples to assist in maintaining this close support. In one form this guiding element may be collation tape used to maintain the staple in a collated arrangement.

Figure 1B:
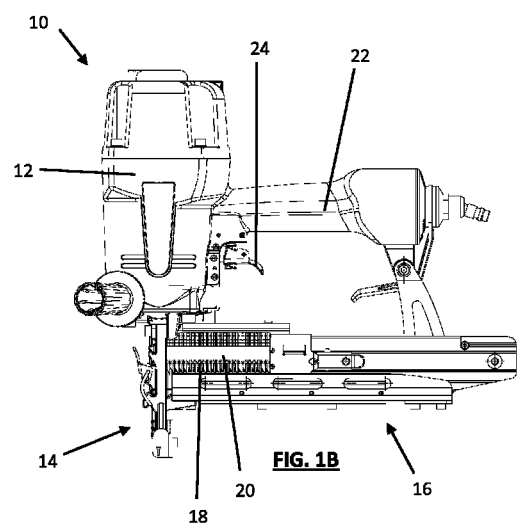

FIGS. 1a and 1b show an embodiment of a tool 10 for driving a barbed staple into a workpiece. The tool 10 comprises a housing 12 containing a power delivery source (not shown). In the illustrated form, the tool is pneumatic (i.e. powered pneumatically). In other embodiments the tool may be, for example, gas powered. A person of ordinary skill in the art would understand that other means for powering a tool would also be suitable.

The tool 10 further comprises a nosepiece assembly 14 extending from a lower end of the housing 12. A staple supply assembly, in the form of a magazine 16, extends laterally from the nosepiece assembly 14. FIG. 1a shows the magazine 16 holding staples 18, whilst in FIG. 1b, the magazine 16 is empty. The magazine 16 supplies collated staples 18 to a loading chamber of the nosepiece assembly 14. In the illustrated form of FIG. 1a, the staples 18 are collated by way of collation tape 20. In other forms, the staples 18 may be collated by way of adhesive, or alternatively may not be collated (i.e. they may be provided individually).

A hand grip 22 extends from the housing 12 and is configured such that a user may comfortably handle the tool 10. Adjacent the hand grip 22 is a trigger 24, which when pressed, activates the power delivery source such that a staple (loaded in the nosepiece assembly 14) may be driven into a workpiece by the tool 10. As a safety measure a lower workpiece contact 48 disposed at a distal end of the nosepiece assembly 14 may need to be retracted to allow activation of the power delivery source.

Figure 2:
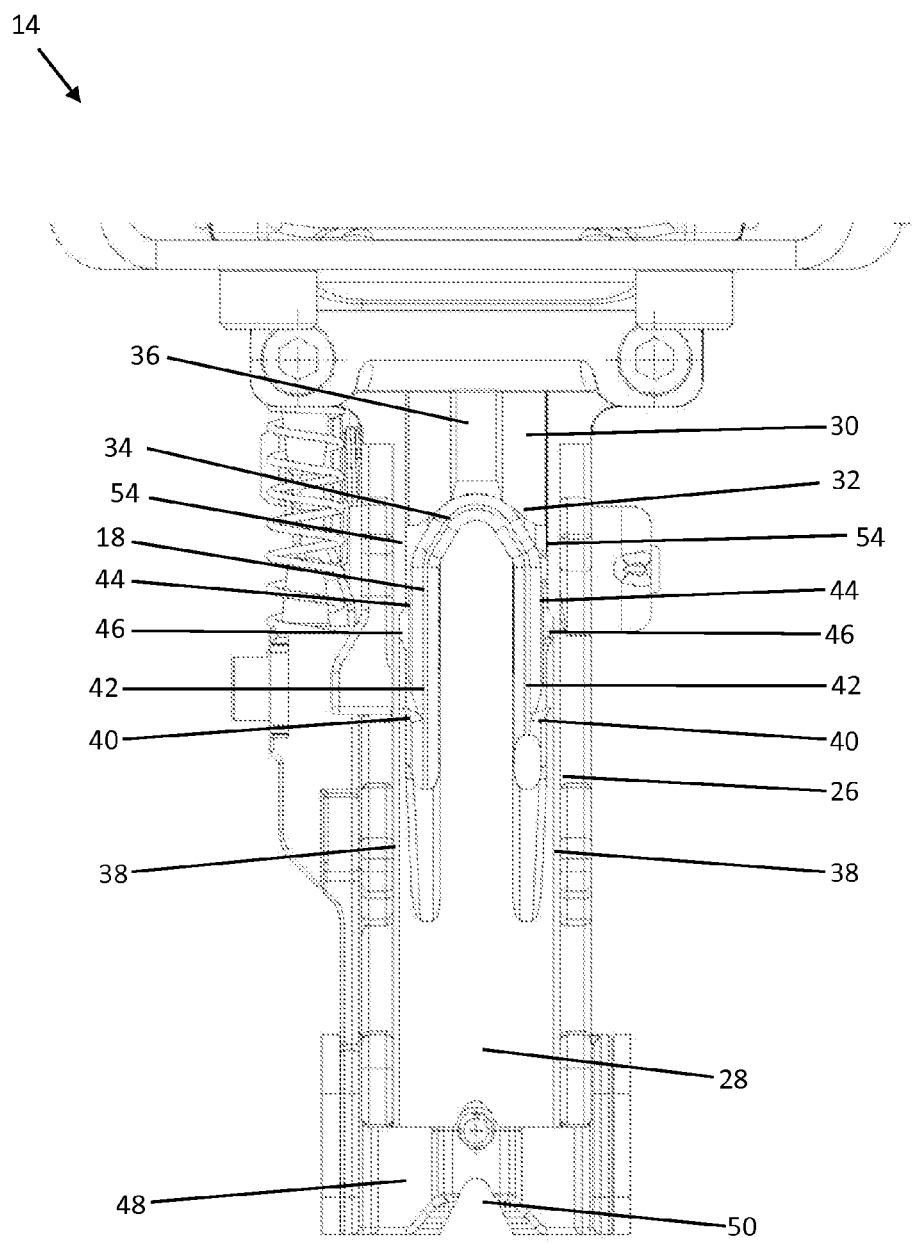
FIG. 2 is a section view of a nosepiece assembly of the tool of FIGS. 1a and 1b.

Referring to FIG. 2, a section of the nosepiece assembly 14 is shown. The nosepiece assembly 14 comprises a nosepiece 26 having a passage 28 along which a driver blade 30 is arranged to travel. In FIG. 2, a staple 18 is located partway down the passage 28 in the nosepiece 26 and is in contact with the driver blade 30 which is designed to push the staple through the nosepiece passage 28.

The tool further comprises a power delivery source (not shown) that is arranged to drive the driver blade 30 down the passage 28 (i.e. towards the distal end of the nosepiece 26 that is located at the workpiece). The driver blade 30 (which is described in more detail below with reference to FIGS. 3A and 3B) comprises an engagement portion 32 that engages the crown 34 of a staple 18 that has been loaded into the passage 28, to drive the staple 18 down the passage 28. In this way, the staple 18 may be driven into and secured in a workpiece.

The staple 18 comprises barbs 40 extending outwardly from the staple legs 42, thereby increasing the overall width of the staple 18. The barbs 40 of the staple 18 as shown comprise a truncated point such that the tips of the barbs 40 are flat (i.e. square) so that they are less likely to come in contact, or sustain damage from contact, with the nosepiece when the staple 18 is driven in the passage 28.

Typically the staple 18 comprises a hot dip galvanization coating, which may provide the staple 18 with rust resistance. A person of ordinary skill in the art would understand that other, or additional, coating or treatment may be applied to the staple such as e.g. electro-galvanization, heat treatment, phosphate etc.

The staple 18 further comprises tape 44 attached to each of its legs 42. The thickness of the tape 44 may be such that it assists in positioning and/or guiding the staple in the nosepiece as will be explained in more detail below.

Figure 4:
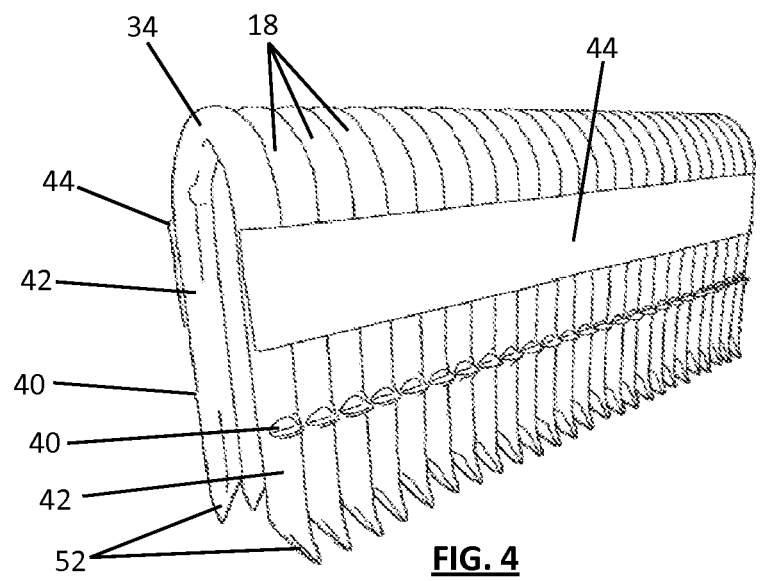
FIG. 4 is a perspective view of an assembly of collated staples that may be suitable for use with an embodiment of the tool.

The tape 44 may, for example, be a portion of collation tape that remains on the staple when it is broken away from a collated staple arrangement. Such a collated arrangement is shown in FIG. 4. In this way, the tape would be 'dual purpose', in that it would first provide for collating the assembly of staples, and secondly provide stability of a staple 18 in the passage 28 when driven by forming a wadding barrier. The tape may alternatively be applied individually to the staple (i.e. such that it is not a portion of collation tape applied to an assembly of collated staples). In one form the tape 44 may be formed of paper, however a person of ordinary skill in the art would understand that the tape may be formed of other suitable materials such as plastic. In addition, the collation tape may protect the staple leg and wire coating and barb from damage.

In the illustrated form the collated staple arrangement is loaded in the magazine 16 and supplies staples 18 to the loading chamber of the nosepiece 26 via an access aperture in the nosepiece 26. The aperture comprises means to provide access for the barbs 40 of the staple 18. In the illustrated form, the means is in the form of lateral passages 46, which provide clearance for the barbs 40 on the staples 18 when loaded from the magazine 16. Furthermore to allow for passage of the staple 18 through the nosepiece 26, clearance spaces in the form of channels 38 are provided along the walls defining the passage 28. These channels extend from the lateral passages 46 to the distal end of the nosepiece 26.

The workpiece contact element 48, in the form of a foot, is located at the lower end of the nosepiece 26. The foot 48 is configured to retract, in use, as it contacts the workpiece. That is, the foot 48 will retract back up the nosepiece 26 when a user pushes the end of the tool 10 against a workpiece in order to allow the power delivery source of the tool 10 to be activated for driving of a staple into 18 the workpiece 9 under operation of the tool trigger). A slot 50 is located in the base of the foot 48 and aligned such that it is perpendicular to the longitudinal axis of the crown 34 of the staple 18, and such that it is located between the legs 42 of the staple in use. Thus in use, a user can align, for example, a fence wire in the slot 50 in order to ensure that the legs of a staple 18 will be driven into the workpiece either side of the wire. This helps to prevent a user from accidentally aligning the tool 10 such that a leg 42 of the staple 18 is driven into the wire, which could cause damage to the wire or any surface treatment applied to the wire. Thus, the slot 50 may help to ensure that the durability of the wire being attached to a workpiece is not compromised (e.g. due to rust).

Because of the existence of the channels 38 and the lateral passages 46 (both of which are provided to cater for the barbs 40 on the staples 18), the tool 10 includes various means to support and/or maintain alignment of the staple in the nosepiece. As mentioned above, the outer surface of the tape is in contact, or close to being in contact, with the surface of the passage 54 disposed proximal of the lateral passages 46. Such an arrangement may provide a closer fit of the upper portion of the staple 18 in the passage 28. This may help to correctly position the staple in the nosepiece to receive the driver blade and to stabilise the motion (i.e. by limiting motion of the staple to the longitudinal axis of the passage 28) of the staple 18 when it is initially driven by the driver blade 30 down the passage 28.

To further assist in maintaining the position of the staple 18 in the nosepiece, the drive blade 36 may be modified to provide lateral support for the staple.

Figures 3A, 3B:
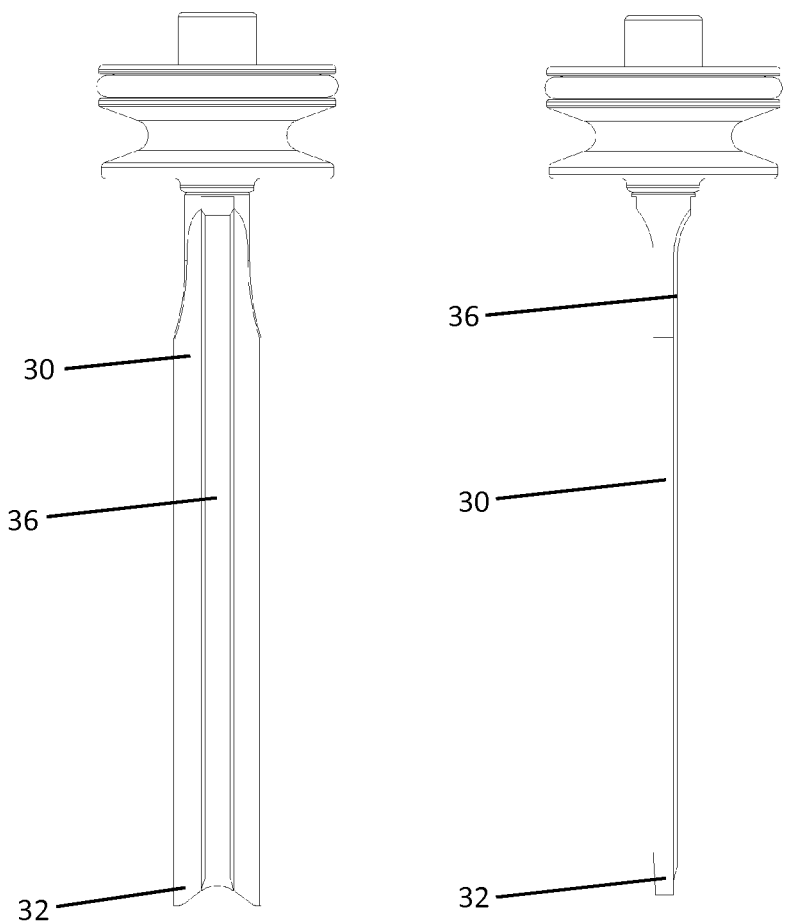
FIGS. 3a and 3b are a front and side view respectively of a driver assembly of the tool of FIGS. 1a and 1b.

FIGS. 3A and 3B provide front and side views respectively of the driver assembly of the embodiment of the tool 10. The driver assembly comprises a driver blade 30 having an engagement portion 32 and ridge 36.

The engagement portion 32 is crescent shaped, such that it conforms to the form of the crown 34 of the staple 18. Such a configuration may allow the engagement portion 32 to guide the staple 18 in the passage 28 and prevent movement of the staple 18 away from the longitudinal axis of the passage 28 (e.g. rotation or lateral movement of the staple 18 in the passage 28). In other words, receipt of the crown 34 of the staple 18 in the concave engagement portion 32 helps to self-centre the staple 18 whilst it is being driven. In use, the power delivery source can be configured such that the driver blade 30 is accelerated as it engages the staple 18 and drives the staple 18 into the workpiece. In this respect, the staple will be held in the crescent (i.e. in continuous contact) throughout the driving action of the driver blade 30 (i.e. from engagement with the driver blade to the staple being embedded in a workpiece).

The crescent shaped engagement portion 32 may also reduce or eliminate damage to any coating that may be applied to the staple 18. This may especially be the case when compared to manual methods of driving a staple 18 into a workpiece (e.g. hand hammer driven).

The driver blade 30 also comprises a ridge 36. This ridge 36 is arranged to align and engage with a corresponding slot (not shown) located on the nosepiece 26. This engagement aligns the driver blade 30 in the passage 28, such that when it is driven, it is substantially restricted to motion along the longitudinal axis of the passage. In the absence of complete side support (i.e. due to the passage 28 comprising channels 38) the ridge 36 may provide partial or full stability to the driver blade 30 during driving action.

Now referring to FIG. 4, the assembly of staples 18 for use with the embodiment of the tool is shown. Each staple comprises a crown 34, two legs 42 and a barb 40 on each leg 42. The staples 18 are collated and connected by paper collation tape 44 applied to the legs 42 of the staples 18. Each staple 18 comprises diverging points 52, which have opposing angled faces such that when a staple 18 is driven into a workpiece, the legs 42 are caused to diverge. As discussed above, the collation tape 44 not only secures the collated staples together but can assist in maintaining alignment of the staple 18 in the nosepiece 26 by providing a closer fit of the upper portion of the staple 18 in the passage 28.

To allow for reliable operation of the staple tool, the dimensions of the staples 18 and their alignment in the collated assembly need to be within relative tight tolerances which may be in the order of ±5 mm. Also the adhesion of the collation tape and its properties influence the operation of the tool. In one form, the staples are manufactured and collated to meet the desired criteria using a process whereby the staples are made using a pressing operation including a 3 stage bending process. During this pressing operation the barbs are formed on the staple legs. The staples then pass onto a staple collation rail where the stables are heated to approximately 300° C. The collation tape (which in one form may be a paper based tape supplied under the trade name PASLODE PRO-STRIP EQ98) is applied to the heated staples where a bond is formed between the collation tape and the metal surface of the staples.

Accordingly a powered staple tool 10 is provided that uses barbed staples 18 which may be in supplied in a collated assembly. This allows for rapid and effective fixing of the staples and is ideal for applications such as fencing. To accommodate for the barbs in the staple legs, adequate clearances are provided in the nosepiece of the tool for both loading and passage of the staple through the nosepiece. As these clearances increase the likelihood of the staple twisting or moving laterally in the nosepiece (which may result in jamming of the staple in the nosepiece), support arrangements are provided to maintain correct positioning of the staple in the nosepiece.

In the claims which follow and in the preceding summary except where the context requires otherwise due to express language or necessary implication, the word "comprising" is used in the sense of "including", that is, the features as above may be associated with further features in various embodiments.

Variations and modifications may be made to the parts previously described without departing from the spirit or ambit of the disclosure.

The invention claimed is:

1. A barbed staple comprising:
    a crown;
    two legs extending from the crown; and
    one or more barbs protruding from the legs;
    said crown has a shape including an arch, at an apex, merging into a straight section declining at an oblique angle to a centerline of a corresponding one of said legs, and said straight section merging into the legs via a curved section; and
    wherein the staple further comprises at least one guiding element secured to at least one of the legs at a location between the respective barb of the leg and the crown.

2. A barbed staple according to claim 1, wherein the at least one guiding element is a portion of collation tape.

3. An assembly of staples for use within a tool having a staple channel extending from a driver blade passage and having enhanced clearance along which the staples travel, the staples comprising:
    a crown portion having at least two legs extending therefrom and one or more barbs protruding from at least one of the legs, the assembly further comprising at least one strip of collation tape, wherein the staples are collated and connected by way of the at least one strip of collation tape secured to the staples, and the collation tape is constructed and arranged to form a wadding barrier that slidingly engages the channel and guides the staples along the staple channel by reducing movement of the staples in the channel.

4. An assembly of staples according to claim 3 wherein the at least one strip of collation tape is secured to legs of the staples at a location between the respective crowns and the one or more barbs of the staples.

5. An assembly of staples according to claim 3, wherein the each of the legs of the plurality of staples include one or more barbs which project outwardly from the legs.

6. A method of driving a barbed staple into a workpiece, the method comprising:
    locating a barbed staple in a nosepiece of a powered tool, providing, in the powered tool a driver blade passage dimensioned for accommodating a reciprocating driver blade and channels extending along walls defining the passage, the channels defining a clearance of ±5 mm, the barbed staple comprising: a crown; two legs extending from the crown; and one or more barbs protruding from the legs; wherein the staple further comprises at least one guiding element secured to at least one of the legs at a location between the respective barb of the leg and the crown, the guiding element being dimensioned to form a wadding barrier for enhancing guidance of the staples in the channel; and driving the staple along a longitudinal axis of the nosepiece and into the workpiece under operation of a driver blade of the powered tool; wherein the guiding element inhibits lateral movement of the staple with respect to the longitudinal axis when it is being driven.

\* \* \* \* \*